(12) United States Patent
Shukh et al.

(10) Patent No.: US 6,504,675 B1
(45) Date of Patent: Jan. 7, 2003

(54) PERPENDICULAR MAGNETIC RECORDING HEADS WITH WRITE POLE SHAPED TO REDUCE SKEW EFFECTS DURING WRITING

(75) Inventors: Alexander M. Shukh, Savage, MN (US); Frank Edgar Stageberg, Edina, MN (US); Edward Stephens Murdock, Edina, MN (US); Sharat Batra, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 34 days.

(21) Appl. No.: 09/759,706

(22) Filed: Jan. 12, 2001

Related U.S. Application Data
(60) Provisional application No. 60/206,872, filed on May 24, 2000, and provisional application No. 60/175,860, filed on Jan. 12, 2000.

(51) Int. Cl.[7] ............................................. G11B 5/187
(52) U.S. Cl. ....................................................... 360/125
(58) Field of Search ................................. 360/126, 125, 360/122

(56) References Cited

U.S. PATENT DOCUMENTS

| | | | |
|---|---|---|---|
| 4,839,761 A | * | 6/1989 | Gatzen ........................ 360/125 |
| RE33,949 E | | 6/1992 | Mallary et al. |
| 5,225,953 A | | 7/1993 | Wada et al. |
| 5,495,379 A | * | 2/1996 | McNeil et al. ............... 360/125 |
| 5,995,341 A | * | 11/1999 | Tanaka et al. ............... 360/122 |

\* cited by examiner

*Primary Examiner*—Robert S. Tupper
(74) *Attorney, Agent, or Firm*—Alan G. Towner, Esq.; Pietragallo, Bosick & Gordon

(57) ABSTRACT

A writer for perpendicular recording on bilayer media with suppressed skew angle effect on the width of the recorded track is disclosed. The writer has a wide and flat trailing edge and a narrow leading edge. In a preferred embodiment, the pole has a trapezoidal cross-section. To suppress the skew effect on the width of the recorded track, the slope angle of the pole sides may be greater than the maximum skew angle in a drive.

20 Claims, 5 Drawing Sheets

US 6,504,675 B1

PERPENDICULAR MAGNETIC RECORDING HEADS WITH WRITE POLE SHAPED TO REDUCE SKEW EFFECTS DURING WRITING

CROSS REFERENCE TO RELATED APPLICATION

This application claims the benefit of U.S. Provisional Patent Application Ser. No. 60/175,860 filed Jan. 12, 2000, and also claims the benefit of U.S. Provisional Patent Application Ser. No. 60/206,872 filed May 24, 2000.

FIELD OF THE INVENTION

The present invention relates to heads for high track density perpendicular magnetic recording, and more particularly relates to writing poles of such heads which exhibit a suppressed effect of the skew angle on the width of the recorded track.

BACKGROUND INFORMATION

Perpendicular magnetic recording systems have been developed for use in computer hard disk drives. A typical perpendicular recording head includes a trailing write pole, a leading return or opposing pole magnetically coupled to the write pole, and an electrically conductive magnetizing coil surrounding the write pole. The bottom of the opposing pole has a surface area greatly exceeding the surface area of the tip of the write pole.

Conventional perpendicular recording media typically include a hard magnetic recording layer and a soft magnetic underlayer which provide a flux path from the trailing write pole to the leading opposing pole of the writer. To write to the magnetic recording media, the recording head is separated from the magnetic recording media by a distance known as the flying height. The magnetic recording media is moved past the recording head so that the recording head follows the tracks of the magnetic recording media, with the magnetic recording media first passing under the opposing pole and then passing under the write pole. Current is passed through the coil to create magnetic flux within the write pole. The magnetic flux passes from the write pole tip, through the hard magnetic recording track, into the soft underlayer, and across to the opposing pole.

Perpendicular recording designs have the potential to support much higher linear densities than conventional longitudinal designs, especially when a bilayer perpendicular media with a soft magnetic underlayer is used. Magnetization transitions on the bilayer recording disk are recorded by a trailing edge of the trailing pole and reproduce the shape of the trailing pole projection on the media plane. However, due to the change in skew angle as the recording head travels in an arc across the disk, this can result in unwanted side writing when a rectangular shaped write pole is used.

The present invention has been developed in view of the foregoing.

SUMMARY OF THE INVENTION

An aspect of the present invention is to provide a perpendicular magnetic recording head for writing on media such as bilayer magnetic recording disks. The writer decreases the dependence of the recorded track width on the skew angle, thereby improving recording density. This is accomplished by controlling the shape of the trailing write pole at the air bearing surface (ABS). The leading edge of the write pole is narrower than the trailing edge of the write pole. In accordance with an embodiment of the invention, the pole of the writer has a trapezoidal cross-section at the ABS with a wide and flat trailing edge and tapered sides. The slope angle of the sides may be greater than or equal to the maximum skew angle of the writer during recording.

An aspect of the present invention is to provide a perpendicular magnetic recording head comprising a write pole, and means for reducing a skew effect during writing of a magnetic recording medium by the write pole.

Another aspect of the present invention is to provide a write pole of a perpendicular magnetic recording head. The write pole comprises a leading edge and a trailing edge, wherein the trailing edge is wider than the leading edge.

A further aspect of the present invention is to provide a perpendicular magnetic recording head comprising an opposing pole and a write pole. The write pole comprises a leading edge and a trailing edge, and the trailing edge is wider than the leading edge.

These and other aspects of the present invention will be more apparent from the following description.

DETAILED DESCRIPTION

Figure 1:
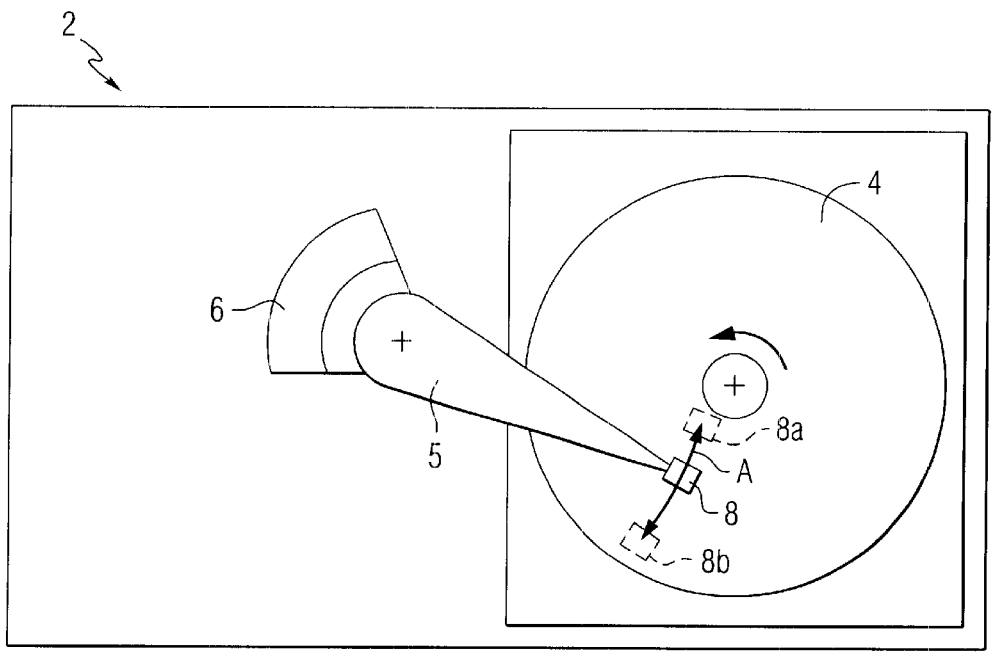
FIG. 1 is a partially schematic top view of a perpendicular magnetic recording disk drive, illustrating skew angles which result during recording operations.

FIG. 1 schematically illustrates a magnetic hard disk drive 2 including a rotatable magnetic disk 4. An actuator arm 5 is connected to a rotary actuator magnet and coil assembly 6. The magnetic hard disk drive 2 includes a magnetic recording head 8. During recording operations, the recording head 8 travels in an arc A between the positions 8a and 8b shown in phantom in FIG. 1. As the recording head 8 moves along the arc A over the disk 4, the head 8 is aligned parallel with the circumferential magnetic data tracks of the disk 4 at one location, but is slightly misaligned at a skew angle at other locations along the arc A. For example, when the recording head 8 is positioned over the disk 4 at its radial innermost position 8a, the maximum skew angle is typically about −12 to −20 degrees. Similarly, when the recording head 8 is located over the disk 4 at the radial outermost position 8b, the maximum skew angle Θ is typically about +12 to +20 degrees. In accordance with the present invention, the write pole of the perpendicular magnetic recording head 8 is shaped to reduce unwanted skew effects during writing operations.

Figure 2:
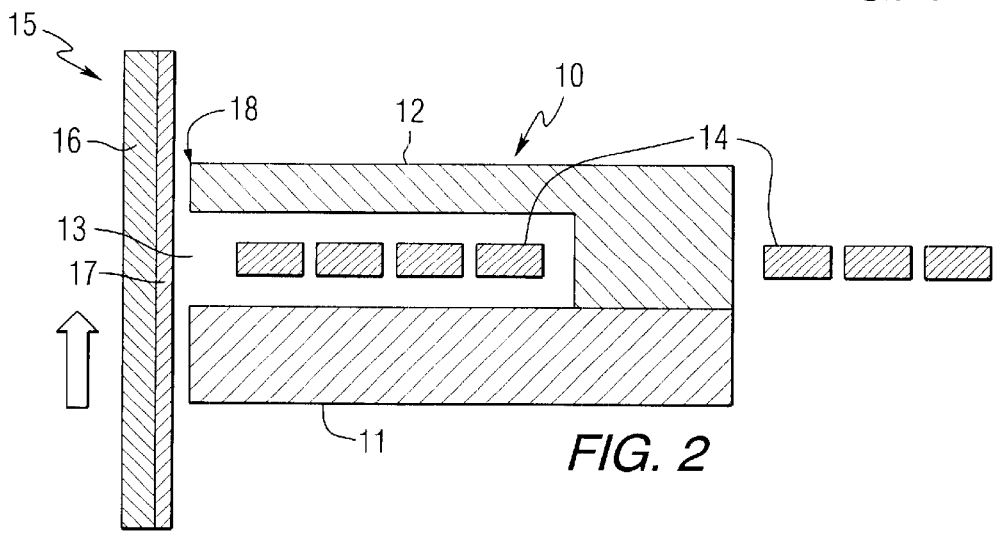
FIG. 2 is a side cross-sectional view of a conventional perpendicular recording head.
Figure 3:
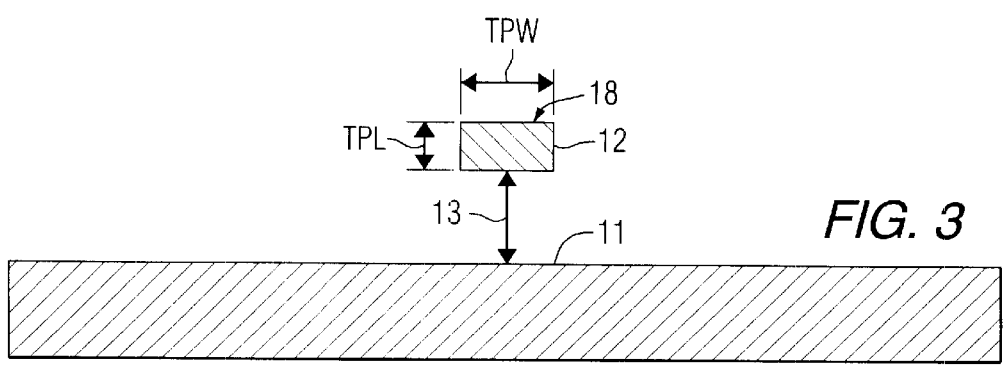
FIG. 3 is a view from the ABS of the recording head of FIG. 2.

A conventional head 10 for perpendicular recording on a bilayer media 15 is schematically shown in FIGS. 2 and 3. The head 10 includes a leading opposing pole 11 and a write pole 12. Magnetization coils 14, shown in cross-section in FIG. 2, surround a yoke of the write pole 12. The recording media 15 includes a magnetically soft underlayer 16 and a magnetically hard recording layer 17. Transitions are recorded on the media 15 by a trailing edge 18 of the write pole 12, which has a rectangular shape at the ABS, as most clearly shown in FIG. 3. Because of the rectangular shape of the write pole 12, the width of the recorded track WW depends on the skew angle and the thickness of the write pole.

Figure 4:
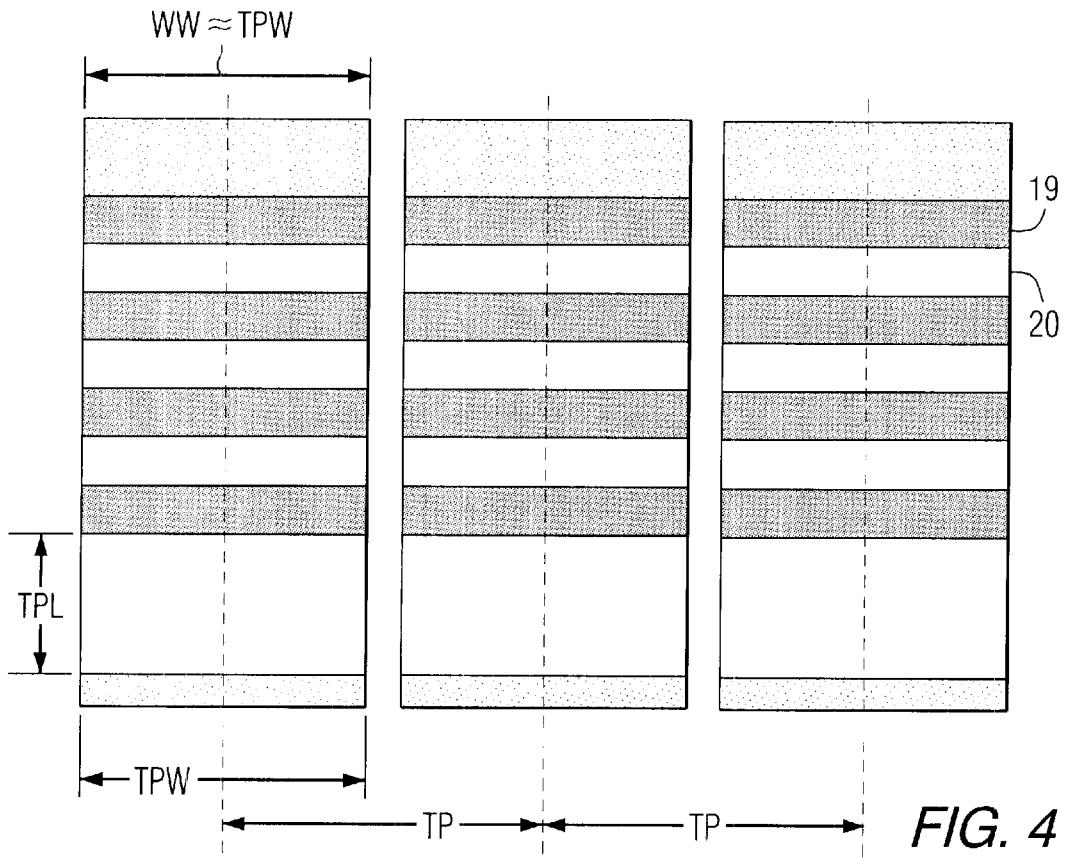
FIGS. 4 and 5 illustrate series of transitions recorded by prior art writers on a perpendicular medium at zero skew angle and at a substantial skew angle.
Figure 5:
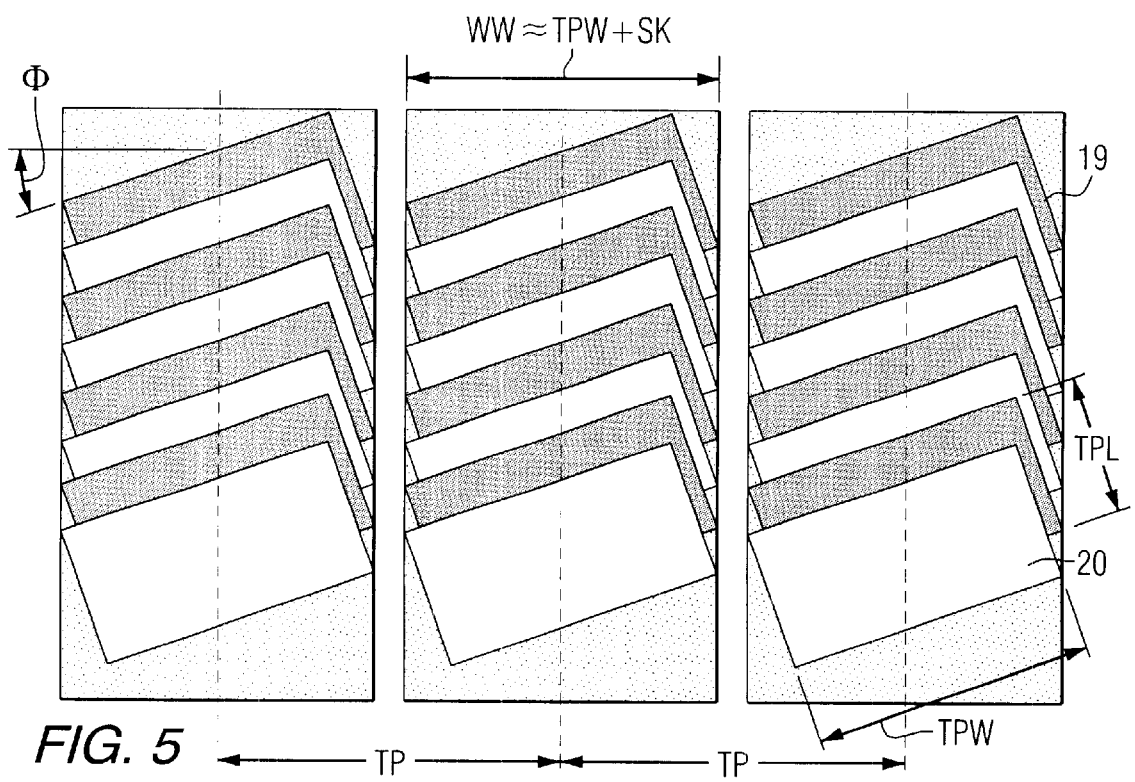

FIGS. 4 and 5 show series of negative 19 and positive 20 transitions recorded on perpendicular media with a conventional write pole at different skew angles of Φ=0 and Φ≈20°, respectively. In FIG. 4, at Φ=0, the write width WW is almost equal to the width TPW (plus any side writing) of the write pole 12. However, as shown in FIG. 5, the width of the recorded tracks WW increases considerably with the increase of the skew angle Φ. In addition to the skew angle Φ, the track width WW also depends on the top pole length TPL. With the increase of TPL the effect of the skew angle on the write width WW is more pronounced. The effect of the skew angle on the write width results in the reduction of track density recording on the perpendicular recording media. In accordance with the present invention, to suppress such a phenomenon, the shape of the write pole 12 cross-section at the ABS is controlled.

Figure 6:
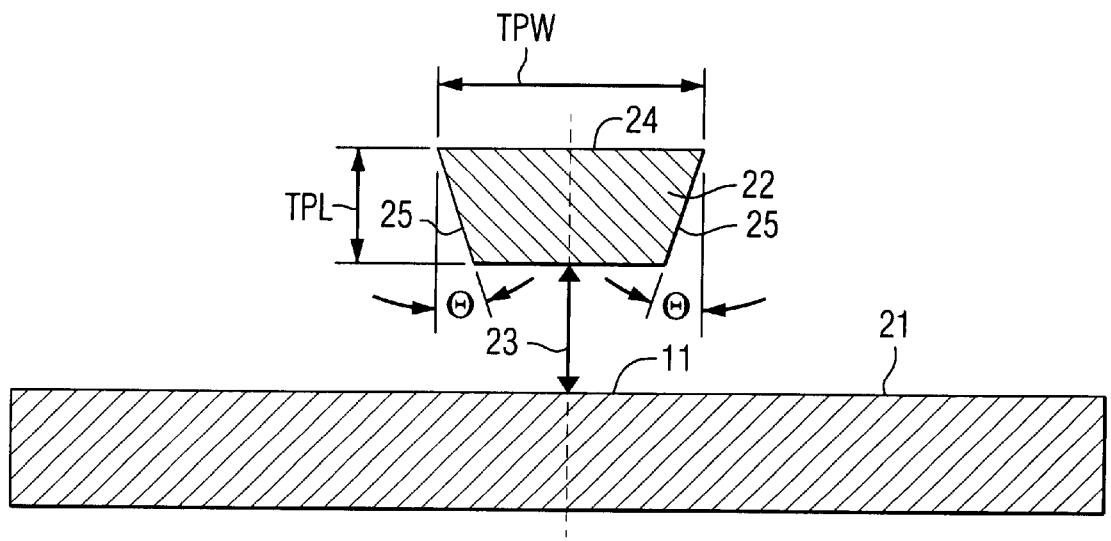
FIG. 6 is a view from the ABS of a write head according to the present invention with a trapezoidal shape of the top pole.

A partially schematic view from the ABS of a write head according to an embodiment of the present invention is shown in FIG. 6. The head includes a leading opposing pole 21 and trailing write pole 22 spaced by a write gap 23. The cross sectional area of the opposing pole 21 is much larger than the cross sectional area of the write pole 22. This provides a low magnetization level of the opposing pole 21 at the ABS during recording and, as a result, prevents erasing information recorded on the adjacent tracks. The smaller cross-sectional area of the write pole 22 provides the write pole 22 with a very high level of pole magnetization at the ABS, and a high write field magnitude which exceeds the coercivity of the perpendicular media. The transitions recorded on perpendicular recording media with a soft magnetic underlayer reproduce the shape of the write pole 22 projection on the media plane. The trailing write pole 22 shown in FIG. 6 has a trapezoidal shape with a wide and flat top edge 24 and beveled sides 25. The canting angle Θ at the sides 25 may be greater than or substantially equal to the maximum skew angle of the head in a drive.

In accordance with the present invention, the canting angle defined by the leading and trailing edges of the write pole may be at least 5 degrees. In one embodiment, the canting angle Θ may be at least 10 or 12 degrees. For example, the canting angle Θ may be greater than 15 degrees, or greater than 20 degrees. In the embodiment shown in FIG. 6, an equal canting angle Θ is provided at both sides 25 of the pole tip 22. Alternatively, the canting angle Θ may be different on each side of the write pole.

In the embodiment shown in FIG. 6, the write pole width TPW may be, for example, from about 10 to about 2,500 nm. As a particular example, the write pole width TPW may be from about 50 to about 200 nm. The write pole length TPL may range, for example, from about 5 to about 500 nm.

Figure 7:
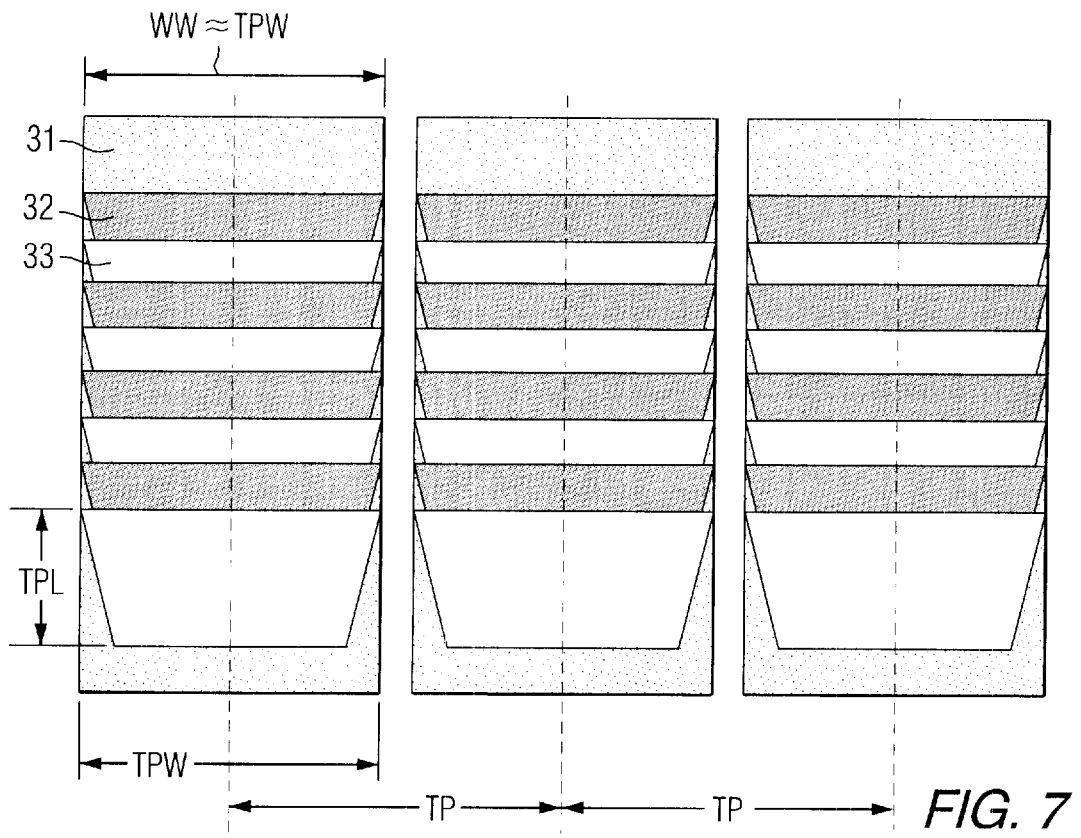
FIGS. 7 and 8 are, respectively, series of transitions recording by the head shown in FIG. 3 on the perpendicular medium with the soft magnetic underlayer at zero skew angle and at a substantial skew angle.
Figure 8:
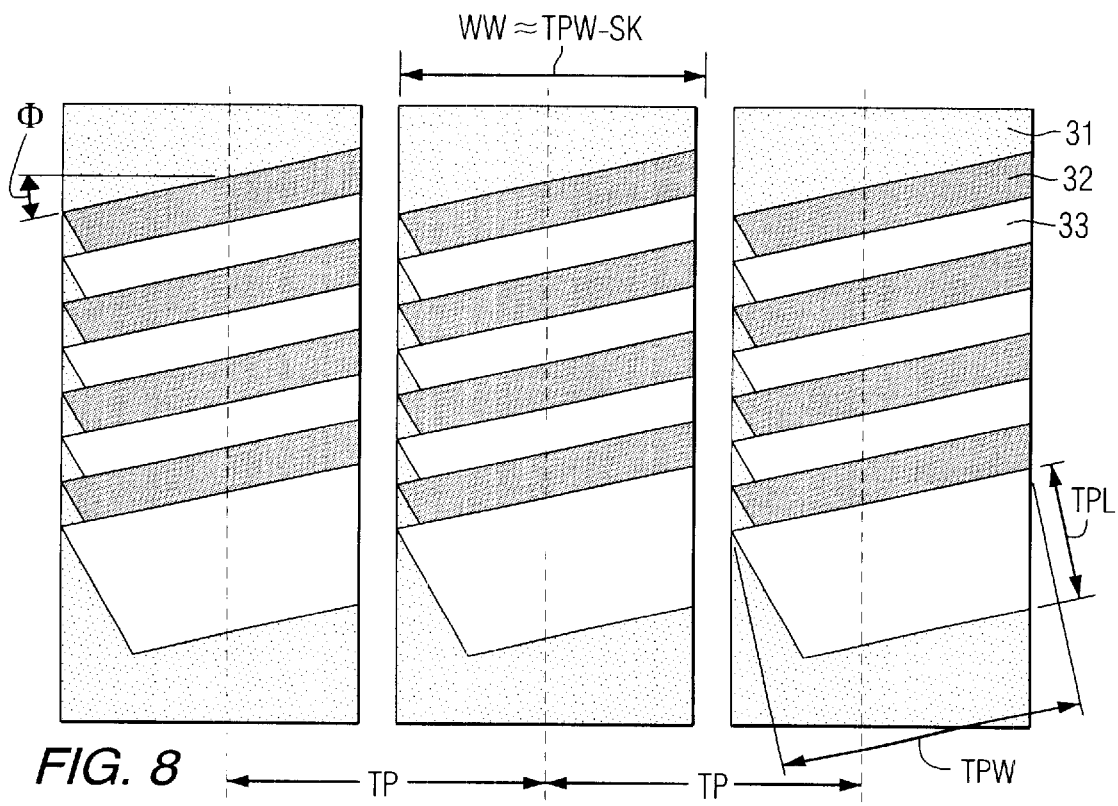

FIGS. 7 and 8 schematically show, respectively, series of negative 32 and positive 33 transitions recorded on tracks 31 by a writer according to the present invention. In FIG. 7, at Φ=0, the width WW of the recorded tracks 31 is the largest and almost equal to the width TPW of the top edge 24 of the write pole 22. However, with the increase of the skew angle Φ, the width WW of the recorded track 31 decreases by an amount SK (which is a function of the skew angle), as shown in FIG. 8. For this particular geometry, the track width WW reduction even at Φ=20° does not exceed about 6 percent of the track width at the skew angle Φ=0. This write design provides low sensitivity of the recorded track width to the skew angle Φ and provides the ability to achieve higher recording densities.

Figure 9:
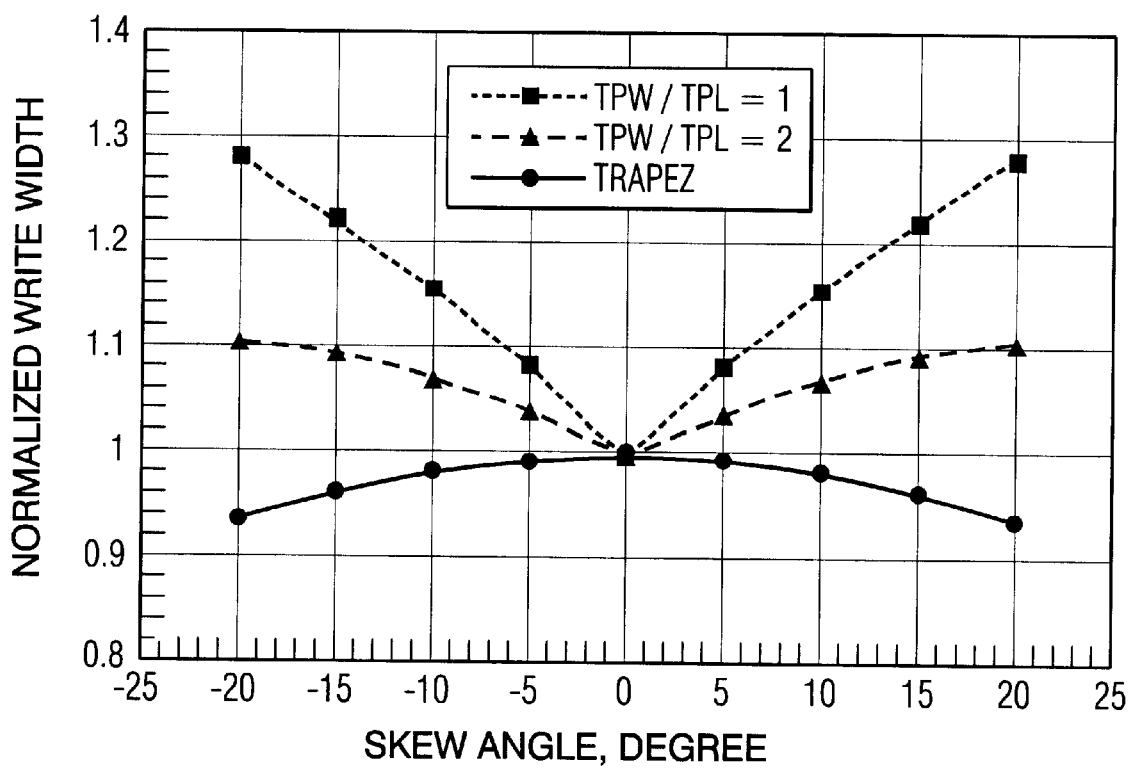
FIG. 9 is a graph illustrating a dependence of a normalized recorded track width WW on the skew angle for square, rectangular, and trapezoidal shape of the top pole at the ABS.

FIG. 9 shows dependence of the normalized track width WW on the skew angle for three different write pole cross sectional shapes at the ABS. The curves 1, 2 and 3, respectively, illustrate the dependence of the normalized track width $WW_\Theta/WW_0$ on the skew angle for a writer with a square (TPW/TPL=1), rectangular (TPW/TPL=2) and trapezoidal write pole. The widths of the tracks recorded by the heads with rectangular and square write poles is smallest at zero skew angle and increases with the skew angle increase, resulting in the reduction of the recorded track density. In contrast, the writer according to the present invention with a trapezoidal write pole has the widest track width at the zero skew angle, and the dependence of the write width WW on the skew angle is significantly reduced in comparison with the writers having square and rectangular write poles. The write width WW may be approximately 10 percent less than the track pitch of the drive at all skew angles.

Figure 10:
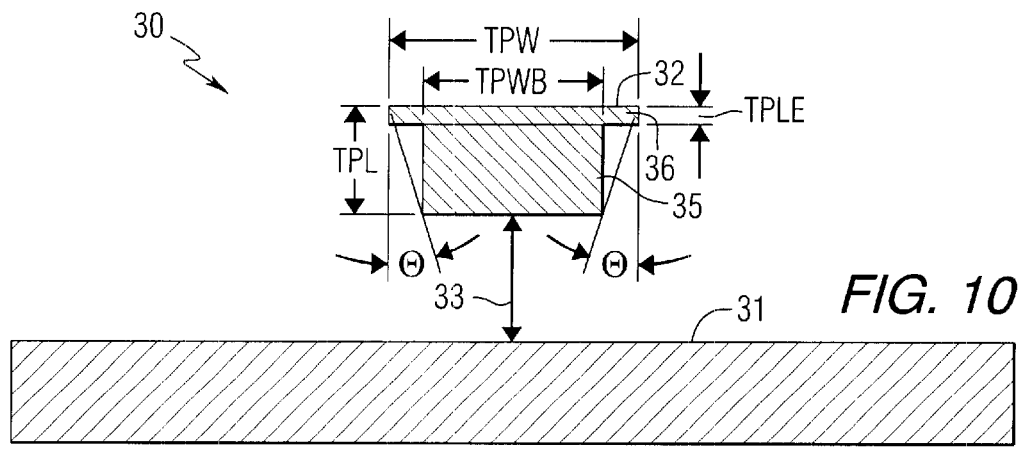
FIG. 10 is a partially schematic bottom view from the ABS of an embodiment of the present invention in which the trailing pole has T-shaped, two-piece structure.

FIG. 10 schematically shows the bottom ABS view of another embodiment of a writer 30 according to the present invention. In this embodiment, the write pole 32 has T-shaped cross-section at the ABS including a narrow first portion 35, and a wide and thin second portion 36. The outside edges of the first 35 and second 36 portions of the write pole 32 define the canting angle Θ, which may be greater than or equal to the maximum skew angle in the drive. The thickness TPLE of the second portion 36 may be about 15 to 20 percent of the width TPW of the second portion 36.

Figure 11:
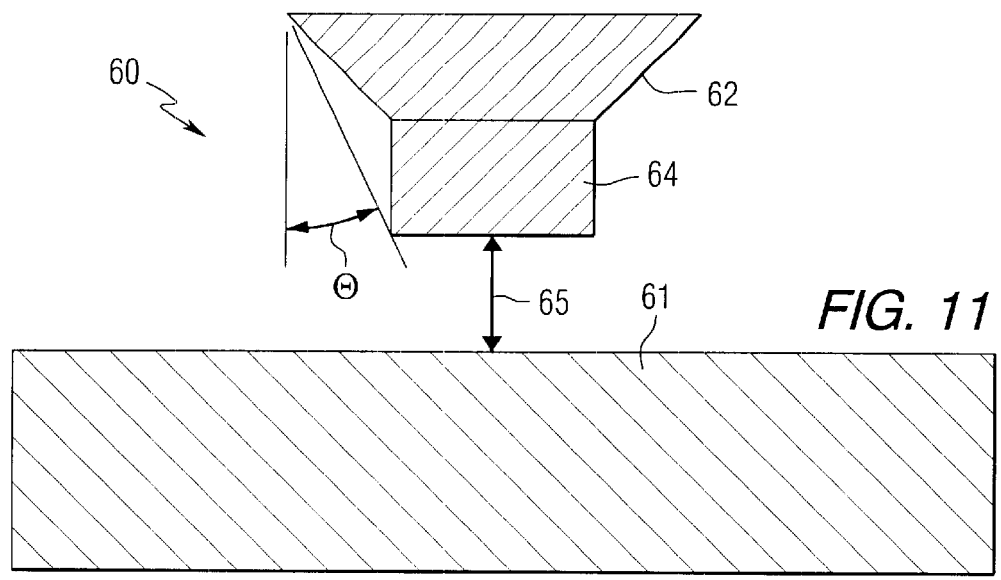
FIG. 11 is a partially schematic bottom view from the ABS of another embodiment of the present invention in which the trailing pole includes both trapezoidal and rectangular sections.

An ABS view of another embodiment is schematically shown in FIG. 11. The writer 60 includes an opposing pole 61 and a two-part trailing pole comprising a wide trapezoidal section 62 and a narrow rectangular section 64. The use of the rectangular section 64 at the leading edge of the pole may improve the ease of fabrication of the head. The opposing pole 61 and leading section 64 of the write pole are separated by a gap 65. As in the previously described embodiments, the canting angle Θ may be greater than or equal to the skew angle of the drive.

Figure 12:
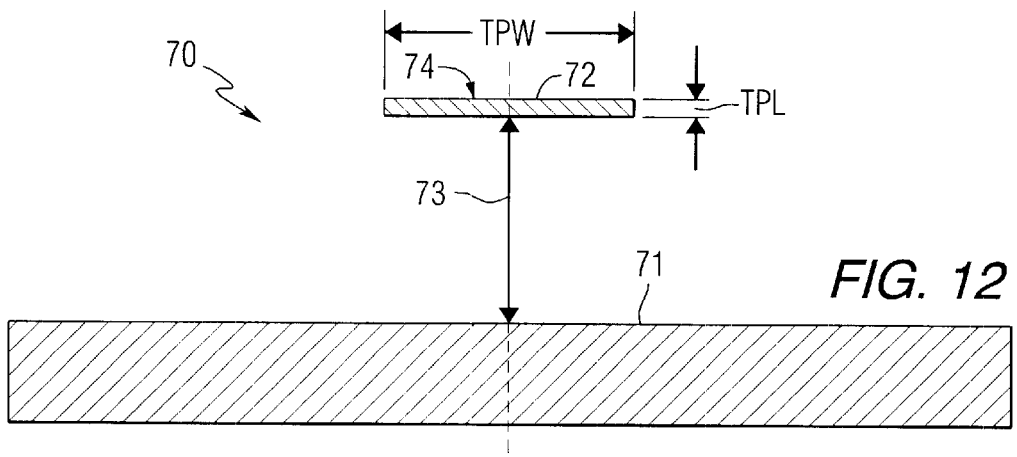
FIG. 12 is a partially schematic bottom view from the ABS of another embodiment of the present invention with a thin rectangular top pole.

An ABS view of another embodiment of a writer 70 is schematically shown in FIG. 12. The writer 70 has a single piece rectangular write pole 72 having a trailing edge 74. The write 72 is spaced from the opposing pole 71 by a gap 73. To suppress the effect of the skew angle on the write width WW the write pole 72 is made very thin. The thickness of the write pole 72 depends on the maximum skew angle, and may be about 15 to 20 or 25 percent of the write pole width TPW for, e.g., $\Theta_{MAX}$=20. However, if the pole is too thin, it may not adequately carry the flux, thereby decreasing efficiency. Therefore, in this embodiment, the thickness of the write pole 72 should be at least 10 percent of the width TPW of the write pole 72 in order to provide sufficient flux-carrying capacity.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording head comprising:
   a write pole; and
   means for reducing a skew effect during writing of a magnetic recording medium by the write pole.

2. The perpendicular magnetic recording head of claim 1, wherein the means for reducing the skew effect comprises providing a leading edge and a trailing edge of the write pole, wherein the trailing edge is wider than the leading edge.

3. The perpendicular magnetic recording head of claim 2, wherein the leading and trailing edges of the write pole define at least one canting angle greater than or substantially equal to a maximum skew angle of the recording head.

4. The perpendicular magnetic recording head of claim 1, wherein the means for reducing the skew effect comprises providing the write pole with a length along a recording track that is less than about 20 percent of its width across the track.

5. A write pole of a perpendicular magnetic recording head, the write pole comprising a leading edge and a trailing edge, wherein the trailing edge is wider than the leading edge.

6. The write pole of claim 5, wherein the trailing edge is substantially straight.

7. The write pole of claim 5, wherein the leading and trailing edges define at least one canting angle greater than or substantially equal to a skew angle of the recording head.

8. The write pole of claim 7, wherein the at least one canting angle is greater than 10 degrees.

9. The write pole of claim 7, wherein the leading and trailing edges define two canting angles.

10. The write pole of claim 9, wherein the canting angles are the same.

11. The write pole of claim 9, wherein the canting angles are different.

12. The write pole of claim 5, wherein the write pole has a substantially trapezoidal cross section at an air bearing surface of the write pole.

13. The write pole of claim 5, wherein the write pole comprises a first portion adjacent the leading edge and a second portion adjacent the trailing edge.

14. The write pole of claim 13, wherein the first portion has a substantially rectangular cross section at an air bearing surface of the write pole.

15. The write pole of claim 14, wherein the second portion has a substantially rectangular cross section at the air bearing surface.

16. The write pole of claim 14, wherein the second portion has a substantially trapezoidal cross section at the air bearing surface.

17. A perpendicular magnetic recording head comprising:
    a opposing pole; and
    a write pole, wherein the write pole comprises a leading edge and a trailing edge, and the trailing edge is wider than the leading edge.

18. The perpendicular magnetic recording head of claim 17, wherein the trailing edge is substantially straight.

19. The perpendicular magnetic recording head of claim 17, wherein the leading and trailing edges define at least one canting angle greater than or substantially equal to a skew angle of the recording head.

20. The perpendicular magnetic recording head of claim 17, wherein the write pole has an air bearing surface cross section, at least a portion of which is substantially trapezoidal.

* * * * *